Dec. 22, 1953  J. P. CARR  2,663,216
HEADLIGHT TESTER
Filed April 1, 1950  7 Sheets-Sheet 1

FIG_1

INVENTOR
JAMES P. CARR
BY *Hans G. Hoffmeister*
ATTORNEY

Dec. 22, 1953    J. P. CARR    2,663,216
HEADLIGHT TESTER
Filed April 1, 1950    7 Sheets-Sheet 2

FIG_2

INVENTOR
JAMES P. CARR

BY Hans G. Hoffmeister
ATTORNEY

Dec. 22, 1953  J. P. CARR  2,663,216
HEADLIGHT TESTER
Filed April 1, 1950  7 Sheets-Sheet 3

FIG_3

INVENTOR
JAMES P. CARR
BY *Hans G. Hoffmeister.*
ATTORNEY

Dec. 22, 1953  J. P. CARR  2,663,216
HEADLIGHT TESTER
Filed April 1, 1950  7 Sheets-Sheet 4

FIG_4

FIG_5

FIG_7
FIG_6

INVENTOR
JAMES P. CARR
BY Hans G. Hoffmeister
ATTORNEY

Dec. 22, 1953   J. P. CARR   2,663,216
HEADLIGHT TESTER
Filed April 1, 1950   7 Sheets-Sheet 5

INVENTOR
JAMES P. CARR
BY Hans G. Hoffmeister
ATTORNEY

Dec. 22, 1953 J. P. CARR 2,663,216
HEADLIGHT TESTER
Filed April 1, 1950 7 Sheets-Sheet 6

INVENTOR
JAMES P. CARR
BY Hans G. Hoffmeister
ATTORNEY

Dec. 22, 1953  J. P. CARR  2,663,216
HEADLIGHT TESTER
Filed April 1, 1950  7 Sheets-Sheet 7

INVENTOR
JAMES P. CARR

BY *Hans G. Hoffmeister*

ATTORNEY

Patented Dec. 22, 1953

2,663,216

UNITED STATES PATENT OFFICE 2,663,216

HEADLIGHT TESTER

James P. Carr, Lansing, Mich., assignor to Food Machinery and Chemical Corporation, San Jose, Calif., a corporation of Delaware Application April 1, 1950, Serial No. 153,474

9 Claims. (Cl. 88—14)

This invention has to do with the testing of automobile headlights and has for its general object the provision of a simplified and improved headlight tester.

The manner of accomplishing the foregoing object, as well as further objects and advantages will be made manifest in the following description taken in connection with the accompanying drawings in which.

Referring specifically to the drawings, the invention is there illustrated as embodied in a headlight tester 15 which includes a housing 16 made up of sidewalls 17 and 18, a bottom wall 19 and a U-shaped top and end wall cover 20. The sidewalls 17 and 18 and cover 20 of the housing 16 are preferably die formed from plastic.

Each of the sidewalls has apertured lugs 21, 22, and 23 which extend inwardly from the rear edge thereof and apertured lugs 24 and 25 which extend inwardly from upper and lower portions of the front edge thereof. Formed integral with the lugs 23 and 25 are apertured footings 26 and 27. The sidewalls 17 and 18 are also provided at opposite points along their upper edges with horizontal lugs 28, vertically faced bosses 29 and horizontal lugs 30. The sidewall 17 has a longer horizontal lug 31 extending inwardly from its upper edge while the sidewall 18 has a pair of vertically faced bosses 32 extending inwardly from its upper edge.

Disposed between the sidewalls 17 and 18 and secured to inner faces of the lugs 21 and 22 by screws 38 and 39 is a frame plate 40. Secured to the lugs 28 against the lower and upper faces thereof by suitable screws are a cross-plate 41 and a horizontal deflection scale 42. Secured at its opposite ends to the bosses 29 of the sidewalls 17 and 18 is a control knob mounting plate 43. Held by suitable screws at its opposite edges to the vertical lugs 24 and 25 at the front end of the housing 16 is a light screening plate 44.

The frame plate 40 has a universal pivot device 45 mounted on the inner face thereof near its lower edge by screws 46 extending through suitable apertures in said plate and into a U-shaped bearing 47 in the arms of which a shaft 48 journals.

Mounted on the shaft 48 is a block 49 which rotates freely between the arms of the U-bearing 47. Extending through said block and the shaft 48 at a mid-point in the latter is a shaft 50 which journals in the bifurcated arms of a U-bearing 51 which is secured by screws 52 to a reflector mounting plate 53.

Figure 2:
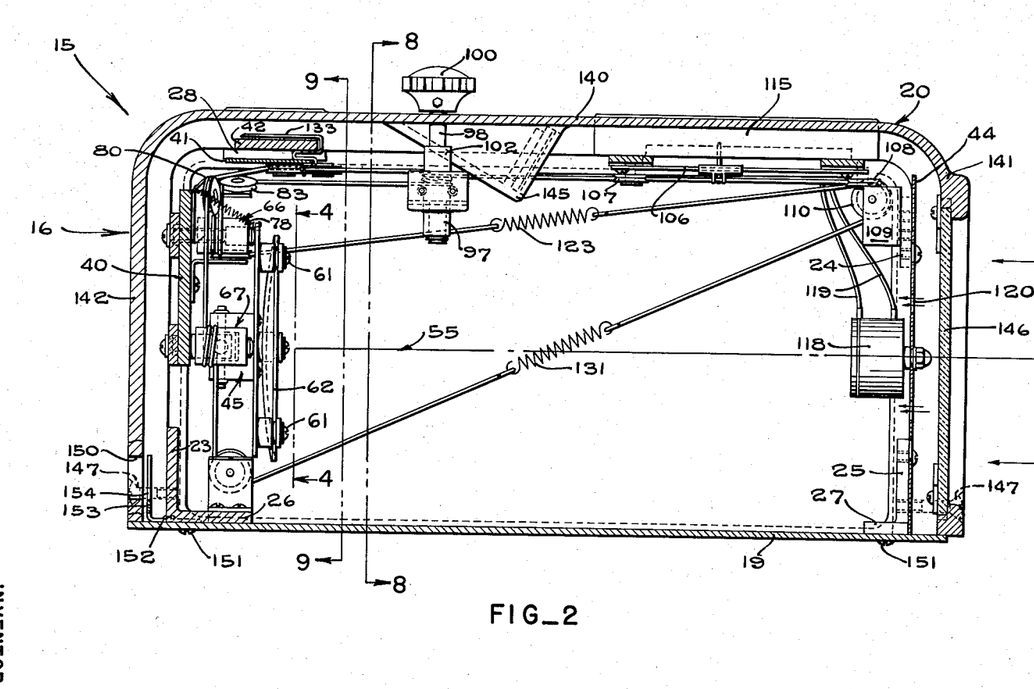
Fig. 2 is a sectional view of Fig. 1 taken on the line 2—2 thereof.
Figure 3:
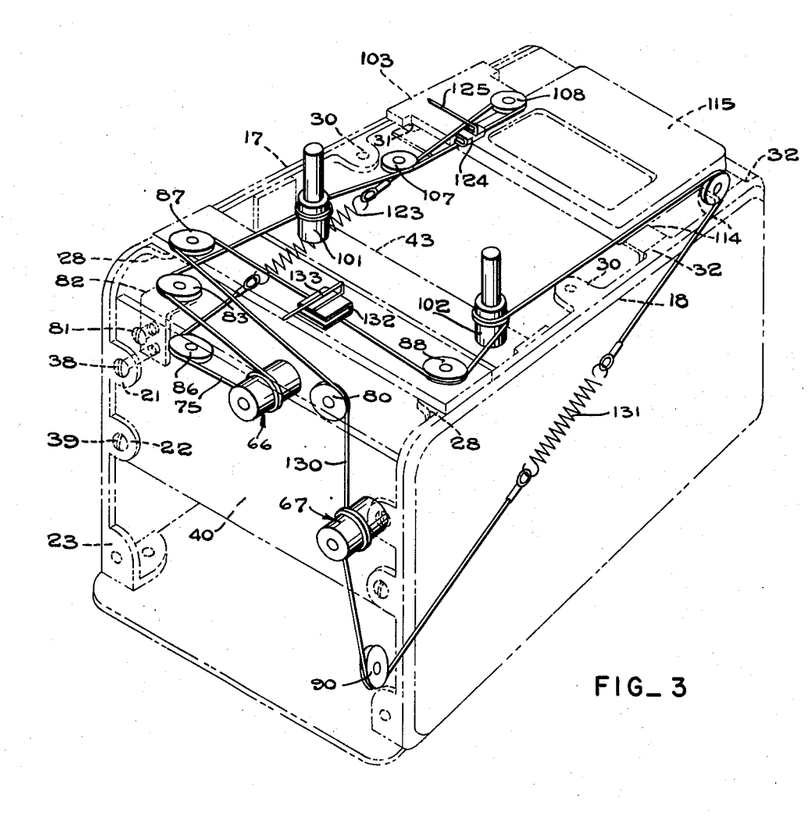
Fig. 3 is a phantom perspective view of the headlight tester of my invention illustrating the manually powered reflector control mechanism.
Figures 4, 5, 7:
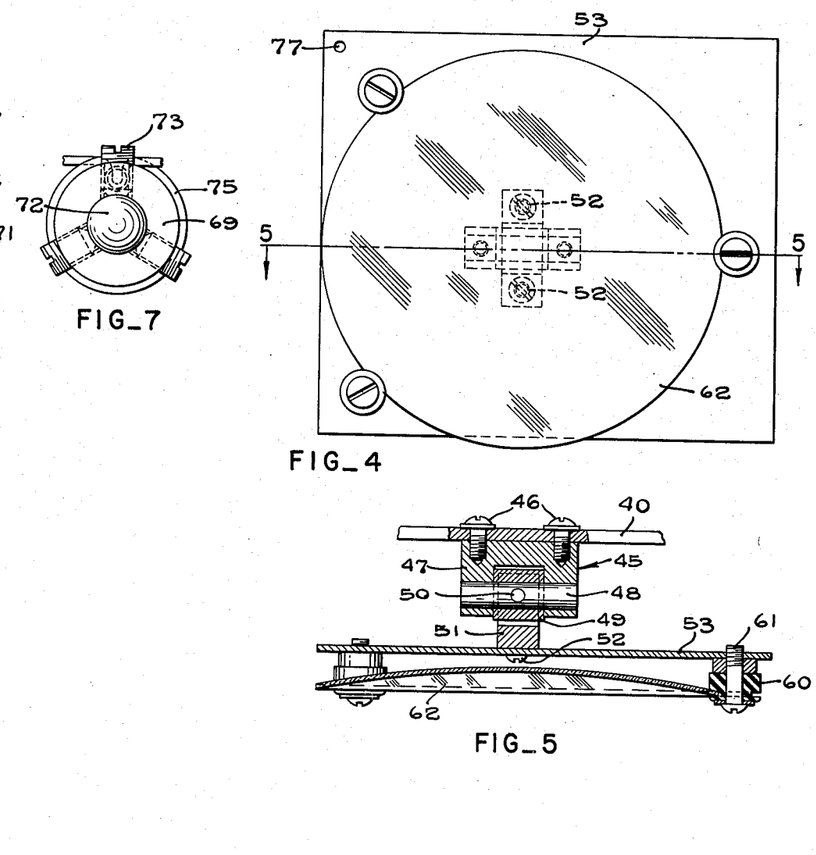
Fig. 4 is an enlarged face view of the reflector of the invention taken on the line 4—4 of Fig. 2.
Fig. 5 is a sectional view taken on the line 5—5 of Fig. 4.
Fig. 7 is a front elevational view of Fig. 6.
Figure 6:
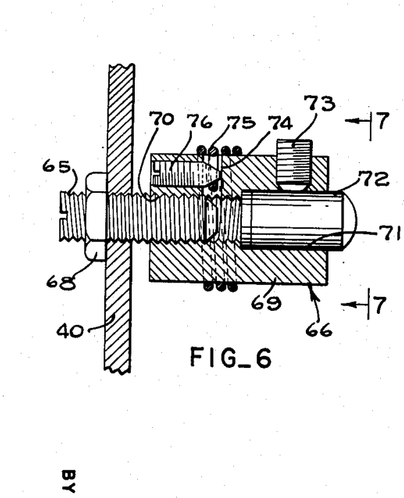
Fig. 6 is an enlarged sectional view taken on the line 6—6 of Fig. 1.
Figure 8:
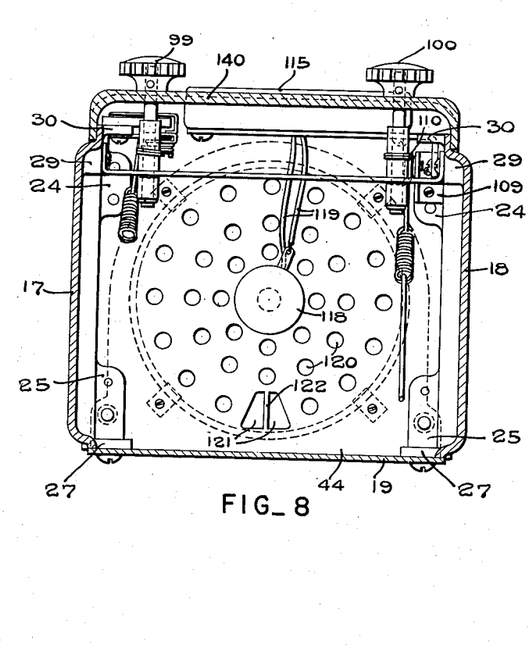
Fig. 8 is a cross sectional view taken on the line 8—8 of Fig. 2.
Figure 9:
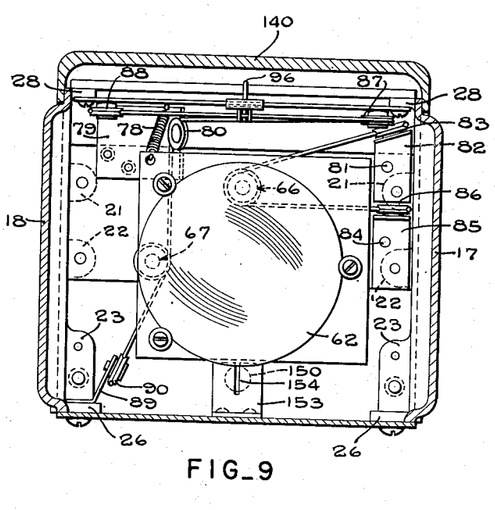
Fig. 9 is a cross sectional view taken on the line 9—9 of Fig. 2.

The device 45 is mounted on frame plate 40 so that the point at which the axes of the shafts 48 and 50 intersect is located on what is designated herein as the reference axis 55 of the headlight tester 15 (Fig. 2). Mounted in rubber spools 60 secured to the plate 53 by screws 61 is a concave reflector 62 (Figs. 4 and 5). The relation between the reflector 62 and plate 53 may be adjusted by tightening up or loosening one of the screws 61 which, through compressing the spool 60 carried thereon, varies the distance between the plate 53 and the portion of the periphery of the reflector 62 which is held by said spool.

Screwed into suitable tapped holes in the plate 40 are screws 65 of adjustable stops 66 and 67. The stop 66 is located in the vertical plane containing the reference axis 55 (and above said axis) and the stop 67 is located in the horizontal plane containing said axis and to the right of the latter. These stops are identical in structure so that a description of the stop 66 will suffice for both. The stop 66 includes one of the screws 65 having a lock nut 68 to fix this in any desired adjusted position in the plate 40. Screwed onto the screw 65 is a cylindrical nut 69, the threaded bore 70 thereof having a counterbore 71 provided therein for receiving a contactor plug 72 which is held in adjusted position in said counterbore by one or more Allen set screws 73, of which there are preferably three.

A radial hole 74 is provided in the cylindrical nut 69 for receiving a bight of a wire cable 75, this bight being made fast to said hole by a set screw 76 screwed into a suitable tapped hole in the nut 69 which opens into the hole 74.

The plate 53 has a hole 77 to which one end of a coil spring 78 attaches, the other end of said spring being connected to a pulley mounting bracket 79 which is fixed on the inner face of the frame plate 40 and which carries a freely rotatable sheave 80. The spring 78 thus holds the reflector mounting plate constantly in contact with the contactor plugs 72, the purpose of which will be made clear hereinafter.

Also secured to the frame plate 40 by the screw 38 and a screw 81 is a bracket 82 on which a sheave 83 is pivotally mounted.

Fixed to the inner face of the frame plate 40 by the screw 39 and a screw 84 is a sheave bracket 85 pivotally carrying a sheave 86. Pivotally supported on suitable posts extending downwardly from opposite end portions of the cross-plate 41 are sheaves 87 and 88.

Pivoted on an angle bracket 89 mounted on the footing 26 of sidewall 18 is a sheave 90.

The deflection scale 42 has calibrations 95 provided thereon (Fig. 1) which are numbered in opposite directions from a central zero line 96 to indicate amounts of left or right deflection of the reflector 62 for a purpose which will be made clear later.

Provided on the control knob mounting plate 43 are bearings 97 in which shafts 98 freely rotate, these shafts having fixed thereto manual control knobs 99 and 100, and cable drums 101 and 102 respectively.

Secured by suitable screws to the upper face of lug 31 is an "up-and-down" deflection scale plate 103 while the same screws secure a plate 106 to the bottom face of said lug. Provided on the plate 103 are calibrations 104 which are numbered serially in opposite directions from the zero line 105 to designate varying amounts of up or down deflection. Mounted rotatably on the lower face of the plate 106 are sheaves 107 and 108. Mounted on the inner face of lug 24 of the wall 18 is a bracket 109 carrying a rotatable sheave 110.

Figure 1:
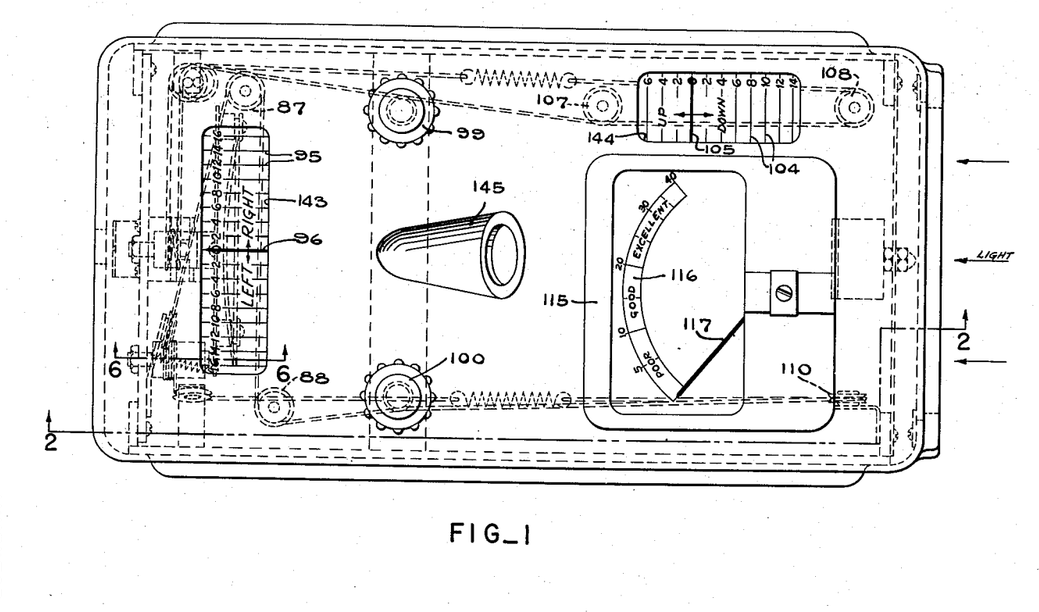
Fig. 1 is a plan view of the headlight tester of my invention.

Fixed on the bosses 32 are a pair of angle brackets 114 on which is mounted a milliammeter 115 which operates in the invention as a "candlepower meter" and has a calibrated scale 116 and indicating needle 117 as shown in Fig. 1.

The light screening plate 44 has a light sensitive cell 118, which is circular in character, mounted centrally thereon and concentrically with respect to the reference axis 55. The terminals of the photo-responsive electric circuit in the cell 118 are connected by conductors 119 to the milliammeter 115. Suitable light apertures 120 are formed in the plate 44 in symmetrical relation with the axis 55.

Also formed in the plate 44 near the lower edge thereof are sight holes 121 which are separated by a relatively thin front sight 122.

The cable 75 which, as previously described, is coiled about the nut 69 of the adjustable stop 66, is trained about pulley 83, from which it extends to control drum 101 about which it is wound several turns and from which it passes over pulley 107, around pulley 108, and then around pulley 86, from which the cable returns to the adjustable stop 66. The free ends of this cable are disposed between pulleys 86 and 108 and are joined by a tension spring 123.

Secured to the cable 75 between the pulleys 107 and 108 is a gib 124 which slides along an adjacent edge of the plate 106, there being a finger 125 mounted on this gib which extends up therefrom and then horizontally to overlie the up-and-down scale plate 103.

Thus it will be seen that by rotation of the control knob 99, the drum 101 is rotated which causes rotation of the nut 69 of adjustable stop 66 through the connection therewith of the cable 75. Rotation of this nut changes the distance which the forward tip of the contactor 72 of this stop is located from the plate 40 and causes a change in the vertical deflection of the reflector 62 from the position in which the reference axis 55 is normal to this reflector.

In a like manner, the adjustable stop 67 is controlled by manipulation of the control knob 100 through a cable 130 which winds about the nut 69 of said stop, about the drum 102 of the control knob 100, is trained about sheaves 80, 87, 88, 90, and 110, and has a contractile coiled spring 131 connecting its free ends to maintain it under tension. Fixed to the cable 130 at a point between sheaves 87 and 88 is a gib 132 which slides along the inner edge of plate 41 and has a finger 133 which extends upwardly around a corresponding edge of the scale plate 42 so as to overlie this plate and indicate thereon the amount of deflection of the reflector 62 to the left or right of the vertical plane containing the axis 55.

The cover 20 is in the shape of an inverted "U" and includes a top wall 140, a front end wall 141 and a rear end wall 142. The top wall 140 is apertured to receive the shafts 98 and to permit the candlepower meter 115 to extend upwardly therethrough.

It also has windows 143 and 144 through which the calibrations 95 and 104 may be viewed. A sight well 145 is provided to permit the operator to look downwardly and forwardly at the screening plate 44 and the light sensitive cell 118 mounted thereon during the operation of the apparatus.

The front wall 141 is provided with a glass window 146 through which light is admitted to the light apertures 120 and 121. The cover 20 is held in place by screws 147 which pass through suitable holes formed in front and end walls 141 and 142 and into suitable threaded apertures provided in the sidewall lugs 23 and 25 respectively.

The end wall 142 has a sight hole 150 which lies in the vertical plane containing the axis 55 and the front sight 122.

The bottom wall 19 of the housing 16 is secured by screws 151 to the footings 26 and 27. Secured as by screws 152 to the upper face of the floor 19 just in front of the sight hole 150 is a rear sight 153 having a notch 154 formed therein which lies in the vertical plane containing the axis 55.

The headlight tester 15 is supported on an elevator platform 160 which is vertically slidable on tubular standards 161 which are fixed at their lower ends on a wheeled carriage 162, the latter having suitable flanged wheels (not shown) which travel on a pair of parallel tracks 163. Two of these wheels travel on one of the tracks 163 and a third, which is vertically adjustable by a screw 164 travels on the other of said rails.

The upper ends of the standards 161 are connected by a headpiece 165.

The platform 160 includes a cross-head 166 having bearings 167 and 168 which slide on standards 161. The cross-head 166 includes two hollow boxes 169 and 170 which are connected by spaced vertical walls 171 and 172. The cross-head 166 and platform 160 are preferably cast integral.

Figures 10, 11:
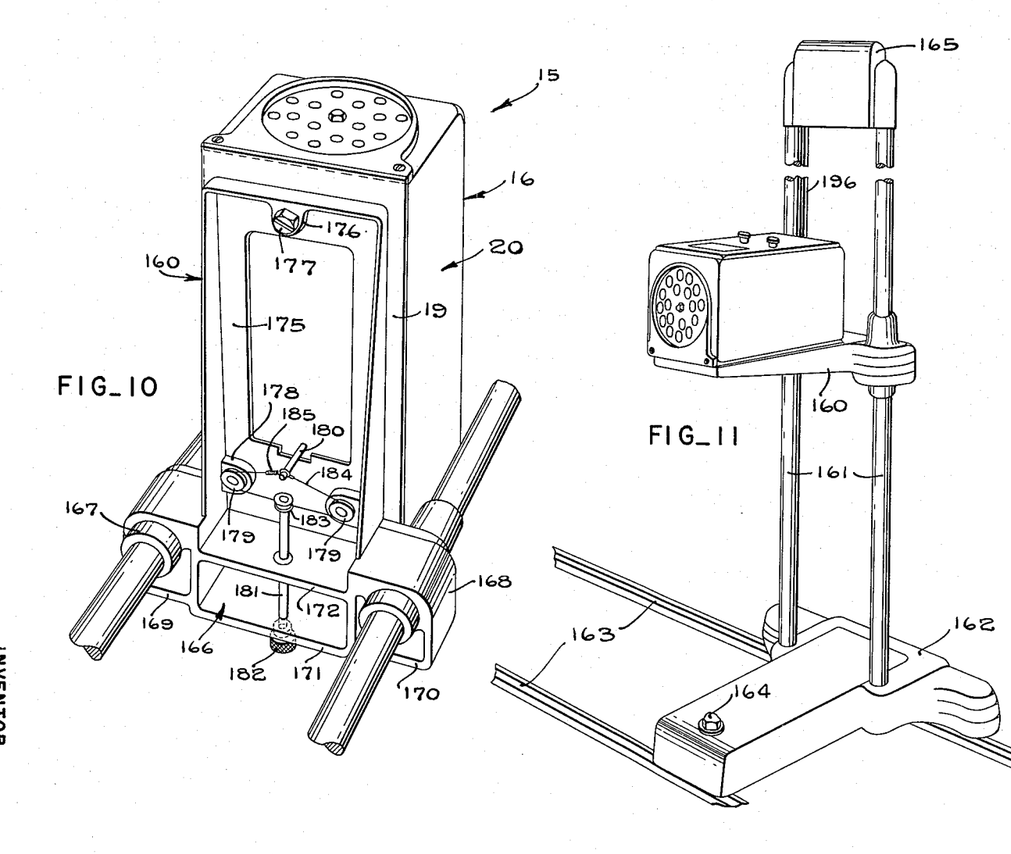
Fig. 10 is a perspective view of the invention looking upwardly from beneath the same.
Fig. 11 is a perspective view of the invention with the vertical mounting bars thereof broken away to compress this view onto the page.
Figure 12:
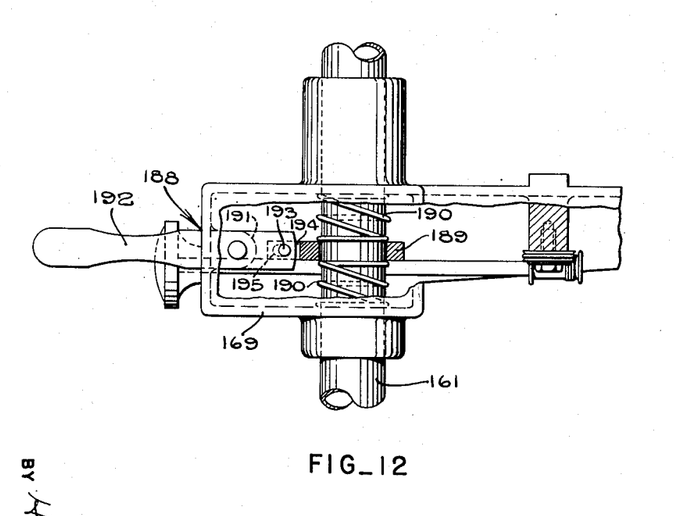
Fig. 12 is an enlarged side elevational view of the sliding tester base partially broken away to illustrate the construction thereof.

As shown in Fig. 10, platform 160 comprises an open rectangular frame 175 and includes a boss 176 through which a screw 177 extends into the floor 19 to pivotally connect the headlight tester 15 to the platform 160.

The platform 160 also has bosses 178 on which sleeves 179 are pivotally mounted. Extending downwardly from the floor 19 is a post 180. Journalled in suitable bearings provided in the cross-head walls 171 and 172 is a control shaft 181 having a knurled knob 182 fixed on its outer end and a spool 183 fixed on its inner end. Wound about spool 183 and trained about the sheaves 179 is a cable 184 having a spring 185 therein, opposite ends of which cable and spring are connected to the post 180.

Mounted in cross-head box 169 is a manually operated elevator clutch 188 including a vertically apertured plate 189 through which the adjacent tube standard 161 extends, there being coiled springs 190 coiled about said tube between said bar and the upper and lower walls of said box.

Extending through a slot in the rear wall of box 169 and pivoted on a lug 191 formed on said box is a manual control lever 192. The inner end of said lever has a cross pin 193 and extends into a notch 194 formed in the plate 189, the opposite ends of the pin 193 extending into horizontal slots 195 formed in said plate on opposite sides of said notch.

The clutch 188 offers a means for making fine adjustments in the vertical position of the tester head on the tubular standards 161, as described in U. S. Letters Patent to Holmes, No. 2,358,010.

The weight of the cross-head 166 and headlight tester 15 is counterbalanced in a manner well known in the art and therefore the means for this is not shown in detail in the drawings. This includes a steel strap 196, one end of which connects to the cross-head 166 and the other end of which extends upwardly over a pulley in the head-piece 165 and down one of the tubular standards 161 where it connects with a counterbalance weight.

*Operation*

Figure 13:
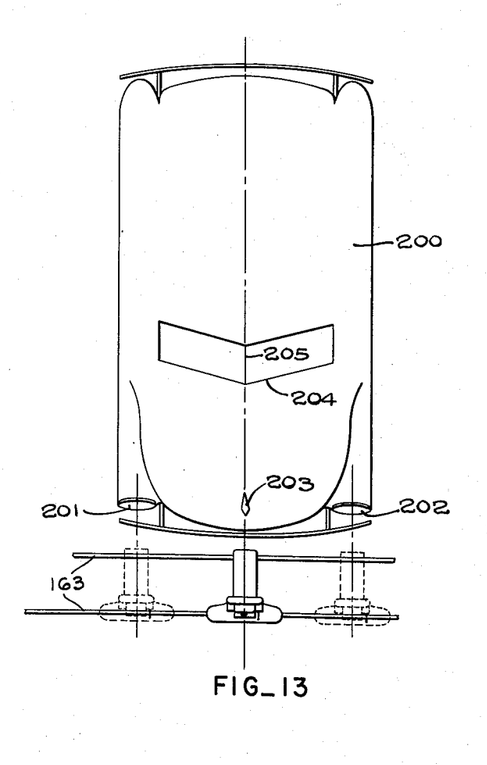
Fig. 13 is a plan view of an automobile and showing in full lines the first position of the headlight tester when testing the headlights of said automobile, and showing subsequent positions of the tester in broken lines.

The manner of employing the headlight tester 15 in testing the headlights of an automobile is illustrated in Fig. 13. This is a plan view of an automobile 200 having headlights 201 and 202, a radiator ornament 203 and a windshield 204 with a central molding 205.

When installing the tracks 163 these are placed with their upper edges parallel with the floor on which they are mounted. The screw 164 is then adjusted to bring the platform 160 into parallelism with the floor which is necessary for the proper functioning of the headlight tester 15.

To test the headlights 201 and 202, the automobile 200 is placed with its longitudinal axis perpendicular to the tracks 163 and with the lens of either of the headlights 201 or 202 approximately fourteen inches from the front of the headlight tester when the latter is located in alignment with said headlight. To obtain maximum accuracy the car 200 is rocked to relieve spring tension, and the tires thereof are inflated to the proper pressure.

The tester is now moved to the center of the car and the operator looks through the rear sight 153, past the front sight 122 until he locates the reference axis 55 of the headlight tester in the same vertical plane with the longitudinal axis of the car 200 as by sighting on the radiator ornament 203 and the central windshield molding 205. Adjustment of the headlight tester 15 to thus bring the reference axis 55 into parallelism with the longitudinal axis of the car is accomplished by rotating the shaft 181, thereby swinging the tester 15 about the screw 177 which pivotally relates the tester to the platform 160.

With the tester aligned with the longitudinal axis of the automobile 200, the headlights are turned on and switched to the high beam. The tester carriage is now rolled along the track until it is in front of one of the headlights and the platform 160 is now lowered until the tester is approximately in line with the headlight beam.

The knobs 99 and 100 are turned to bring the fingers 125 and 133 opposite the zero marks 105 and 96 respectively. This brings the axis of the reflector 62 into coincidence with the reference axis 55. Now, while watching the candle-power meter 115, roll the tester back and forth along the track to the position where the maximum reading is obtained. This having been done, the lever 192 is manipulated to move the headlight tester up or down to the position where the candle-power meter shows a maximum reading.

The next step is to rotate the knob 99 until the maximum reading appears on the candle-power meter 115. Then rotate knob 100 until a maximum reading is obtained on the candle-power meter.

These steps are followed by a repetition of the steps of shifting the carriage 162 on the tracks 163 until the maximum candle-power reading is obtained and readjusting the platform 160 vertically until a maximum candle-power reading is obtained.

The readings on the scales 42 and 103 now show the horizontal and vertical deflection of the headlight beam from horizontal-straight-ahead in terms of inches deflection at twenty-five feet, and the candle-power meter 115 indicates the actual candle-power output.

After determining and noting the present aim of the beam of a headlight, it is desirable to adjust the headlight so that the beam will be correctly directed therefrom. This is accomplished by turning the knobs 99 and 100 to set the fingers 125 and 133 at the proper values of vertical and horizontal deflection which the light beam is legally required to have. In nearly all States this is three inches below horizontal for the vertical aim and straight ahead for the sidewise aim.

The tester 15 having been set as indicated, the candle-power meter 115 will now give the maximum reading when the headlight has been adjusted so that the beam thereof is directed in accordance with the setting of the tester. The headlight is therefore now adjusted horizontally until a maximum reading appears on the candle-power meter and then vertically until a maximum reading appears on that meter. The adjustment of one headlight having been completed, the other light is adjusted in a similar manner.

The present invention superceeds a similar tester in which the reflector was fixed within the housing and it was necessary to shift the axis of the entire housing vertically and horizontally in the process of measuring the precise direction in which a beam emitted by a given headlight is traveling. The mounting of the reflector in the present invention so that it may be readily rocked in vertical and horizontal planes about a point on the axis of the light cell which is located on the convex side of the reflector, greatly simplifies and lowers the cost of the tester and the mounting therefor.

The claims are:

1. In a headlight tester, the combination of: a housing forming a chamber, said housing having a front wall with openings for the admission of light into said chamber; a light sensitive cell mounted on said front wall to face inwardly and having its axis coincident with and in fixed relation to a predetermined reference axis of the tester; a concave focusing reflector disposed at the opposite end of said chamber from said cell; a mount supporting said reflector for universal movement relative to said cell and having the pivot point thereof coincident with and in fixed relation to said reference axis; manually operable means for controlling the universal movement of said reflector about said pivot point; and a candle-power meter operatively connected with and responsive to said light sensitive cell for measuring the intensity of the light reflected onto said cell by said reflector.

2. A combination as in claim 1 in which said reflector is mounted on a plate and said plate is in turn secured to said pivotal mount; a pair of extensible stops provided on said housing to the rear of said plate and extending horizontally into contact therewith, one of said stops lying in a longitudinal vertical plane containing said pivotal point, and the other of said stops lying in the horizontal plane containing said point; a spring holding said plate yieldably in contact with said stops; and a mechanism connecting each of said controls to one of said stops for selectively extending or retracting said extensible stops for the purpose of rotating said reflector about said point in a vertical or horizontal plane as desired.

3. A combination as in claim 2 in which each of said stops includes a screw mounted on said housing and a nut into which said screw is threaded; and means in said mechanism for rotating said nuts of said stops for controllably rotating said reflector about said point as aforesaid.

4. A combination as in claim 3 in which rotation of said nuts is accomplished by cables wound thereabout and rotary drums about which said cables are also wound and which are provided with knobs disposed outside of said housing and the manual rotation of which is transmitted by said cables to said nuts.

5. A combination as in claim 4 in which graduated scales are provided on said housing and which are visible from the exterior thereof, one of said scales being associated with each of said cables and having graduations, the scale associated with the cable connected with the nut of said stop in said vertical plane having graduations for measuring the tilt of said reflector in a vertical plane and the other of said scales being associated with the cable connected to the nut of the stop located in said horizontal plane and having graduations for measuring the tilt about said point of said reflector in a horizontal plane; and fingers carried by said cables and overlying the scales respectively associated with said cables, for indicating on said scales the precise amount of deviation of said reflector in a vertical or horizontal plane from a given reference position of said reflector.

6. In a headlight tester, the combination of: a housing forming a chamber, said housing having a front wall with openings for the admission of selected light beams into said chamber, a light sensitive cell mounted in a forward portion of the chamber to face rearwardly and having its axis coincident with and in fixed relation to a predetermined reference axis of the tester, focusing reflector means disposed in a rearward portion of the chamber opposite said front wall openings to face said openings and said cell, said reflector means being mounted for universal tilting movement relatively to said cell and having the pivot point thereof coincident with and in fixed relation to said reference axis, manually operable means for controlling the universal tilting movement of said reflector means about said pivot point, means for indicating the degree of relative tilt of said reflector means to said reference axis, and light intensity indicating means operatively connected with and responsive to said cell to measure and indicate the intensity of light reflected onto the cell by the reflecting means.

7. In a headlight tester, a housing forming a chamber and including a perforated front wall to admit light to the interior of the chamber, a light sensitive cell mounted within the chamber adjacent said front wall and having its axis coincident with and in fixed relation to a predetermined reference axis of the tester, a reflector disposed at the opposite end of the chamber from the cell to reflect light toward the cell, a universal joint mounted within said chamber rearwardly of said reflector to support the same for universal movement relatively to said cell and having the pivot point thereof coincident with and in fixed relation to said reference axis, manually operable means for controlling the universal movement of said reflector about said pivot point, and means operatively associated with said cell to indicate the intensity of light directed toward the cell by said reflector.

8. In a headlight tester, a housing forming a chamber and including a perforated front wall to admit light to the interior of the chamber, a light sensitive cell mounted within the chamber adjacent said front wall and having its axis coincident with and in fixed relation to a predetermined reference axis of the tester, a tiltable reflector mounting plate disposed at the opposite end of the chamber from the cell, a reflector adjustably mounted upon said plate to reflect light toward the cell, a universal joint disposed within said chamber rearwardly of said mounting plate to support the same and its correlated reflector for universal movement relatively to said cell and having the pivot point thereof coincident with and in fixed relation to said reference axis, manually operable means for controlling the universal movement of said mounting plate and reflector about said pivot point, and means operatively associated with said cell to indicate the intensity of light directed toward the cell by said reflector.

9. In a headlight tester, a housing forming a chamber and including a perforated front wall to admit light to the interior of the chamber, a light sensitive cell mounted within the chamber adjacent said front wall and having its axis coincident with and in fixed relation to a predetermined reference axis of the tester, a tiltable concavo-convex reflector disposed at the opposite end of the chamber from the cell to reflect light toward the cell, a universal joint disposed with said chamber on the convex side of said reflector to support the same for universal movement relatively to said cell and having the pivot point thereof coincident with and in fixed relation to said reference axis, manually operable means for controlling the universal movement of said reflector about said pivot point, and means operatively associated with said cell to indicate the intensity of light directed toward the cell by said reflector.

JAMES P. CARR.

References Cited in the file of this patent

UNITED STATES PATENTS

| Number | Name | Date |
|--------|------|------|
| 1,919,200 | Childs | July 25, 1933 |
| 2,288,807 | Kenworthy | July 7, 1942 |
| 2,358,010 | Holmes | Sept. 12, 1944 |
| 2,411,879 | Holmes | Dec. 3, 1946 |